United States Patent
Jung et al.

(10) Patent No.: US 10,080,227 B2
(45) Date of Patent: Sep. 18, 2018

(54) APPARATUS AND METHOD FOR TRANSMITTING DATA SIGNALS IN WIRELESS COMMUNICATION SYSTEM

(71) Applicant: Samsung Electronics Co., Ltd., Gyeonggi-do (KR)

(72) Inventors: Sung-Kyu Jung, Gyeonggi-do (KR); Jong-Ho Oh, Gyeonggi-do (KR); Hyun-Jeong Kang, Seoul (KR); Dae-Hyun Kim, Seoul (KR); Jae-Won Kim, Seoul (KR); Chang-Hyun Baik, Gyeonggi-do (KR); Sang-Hyun Chang, Seoul (KR); Byoung Hoon Jung, Seoul (KR); Hyun-Kyu Yu, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 36 days.

(21) Appl. No.: 14/852,033

(22) Filed: Sep. 11, 2015

(65) Prior Publication Data

US 2016/0081090 A1 Mar. 17, 2016

Related U.S. Application Data

(60) Provisional application No. 62/049,085, filed on Sep. 11, 2014.

(30) Foreign Application Priority Data

Aug. 21, 2015 (KR) .................. 10-2015-0118027

(51) Int. Cl.
*H04W 72/04* (2009.01)
*H04L 5/00* (2006.01)
*H04W 48/08* (2009.01)

(52) U.S. Cl.
CPC ....... *H04W 72/0453* (2013.01); *H04L 5/0007* (2013.01); *H04W 48/08* (2013.01)

(58) Field of Classification Search
None
See application file for complete search history.

(56) References Cited

U.S. PATENT DOCUMENTS

| 9,246,665 B2 * | 1/2016 | Tanaka ................ H04L 1/0028 |
| 2010/0034108 A1 * | 2/2010 | Ode ..................... H04W 72/02 370/252 |

(Continued)

OTHER PUBLICATIONS

Prepared by the 802.11 Working Group of the 802 Committee Information Technology, elecommunications and information exchange between systems, Local and metropolitan area networks, Specific requirements, Part 11: Wireless LAN Medium Access Control (MAC) and Physical Layer (PHY) specifications, Amendment 4:Enhancements for Very High Throughput for Operation in Bands below 6 GHz IEEE P802.11ac™/D5.0, Jan. 2013.

*Primary Examiner* — Kouroush Mohebbi
(74) *Attorney, Agent, or Firm* — The Farrell Law Firm, P.C.

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). A terminal and method are provided for data signal transmission in a wireless communication system. The method includes receiving identification information of a band designated for the terminal; receiving a data signal generated based on resource allocation information on the band and an orthogonal frequency division multiple access (OFDMA) scheme; and demodulating and decoding the data signal based on the resource allocation information.

32 Claims, 27 Drawing Sheets

(56) References Cited

U.S. PATENT DOCUMENTS

2011/0051705 A1 3/2011 Jones, IV et al.
2016/0301507 A1* 10/2016 Nakao .................. H04L 1/1621

* cited by examiner

FIG.13

| PER-BAND PARAMETER | PER-USER PARAMETER [UB=$i_0$, UP=0] | ... | PER-USER PARAMETER [UB=$i_0$, UP=THE NUMBER OF USERS IN BAND $i_0$] |
|---|---|---|---|
| PER-BAND PARAMETER | PER-USER PARAMETER [UB=$i_1$, UP=0] | ... | PER-USER PARAMETER [UB=$i_1$, UP=THE NUMBER OF USERS IN BAND $i_1$] |
| PER-BAND PARAMETER | PER-USER PARAMETER [UB=$i_2$, UP=0] | ... | PER-USER PARAMETER [UB=$i_2$, UP=THE NUMBER OF USERS IN BAND $i_2$] |
| PER-BAND PARAMETER | PER-USER PARAMETER [UB=$i_3$, UP=0] | ... | PER-USER PARAMETER [UB=$i_3$, UP=THE NUMBER OF USERS IN BAND $i_3$] |

1008

FREQUENCY

FIG.14

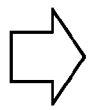
FIG.18

FIG.25

APPARATUS AND METHOD FOR TRANSMITTING DATA SIGNALS IN WIRELESS COMMUNICATION SYSTEM

PRIORITY

This application claims priority under 35 U.S.C. § 119 to U.S. Provisional Application Ser. No. 62/049,085, which was filed in U.S. Patent and Trademark Office on Sep. 11, 2014 and to Korean Patent Application Serial No. 10-2015-0118027, which was filed in the Korean Intellectual Property Office on Aug. 21, 2015, the entire content of each of which is incorporated herein by reference.

BACKGROUND

1. Field of the Disclosure

The present disclosure relates generally to data signal transmission in a wireless communication system.

2. Description of the Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANO, ultra-dense networks, device-to-device (D2D) communication, wireless backhaul, moving network, cooperative communication, Coordinated Multi-Points (COMP) reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Furthermore, Institute of Electrical and Electronics Engineers (IEEE) 802.11 ac, which is the current wireless local area network (LAN) standard, supports simultaneous data transmission to a plurality of users by using a multiple user-multiple input multiple output (MU-MIMO) scheme. However, because reception performance degrades in an area crowded with users, an alternative method for more effectively providing a service to a plurality of users is required.

SUMMARY

An aspect of the present disclosure is to provide an apparatus and a method for transmitting a data signal in a wireless communication system.

Another aspect of the present disclosure is to provide an apparatus and a method for transmitting a data signal in an orthogonal frequency division multiple access (OFDMA) scheme in a wireless communication system.

Another aspect of the present disclosure is to provide an apparatus and a method for transmitting control information for a data signal in an OFDMA scheme in a wireless communication system.

Another aspect of the present disclosure is to provide an apparatus and a method for transmitting band allocation information with respect to a data signal in an OFDMA scheme in a wireless communication system.

Another aspect of the present disclosure is to provide an apparatus and a method for transmitting band mapping information with respect to a data signal in an OFDMA scheme in a wireless communication system.

Another aspect of the present disclosure is to provide an apparatus and a method for supporting a MU-MIMO scheme and an OFDMA scheme in a wireless communication system.

Another aspect of the present disclosure is to provide an apparatus and a method for applying a MU-MCMO scheme to each subcarrier area that is divided through OFDMA in a wireless communication system.

Another aspect of the present disclosure is to provide an apparatus and a method for increasing a number of terminals that can be supported in a wireless communication system.

Another aspect of the present disclosure is to provide an apparatus and a method for increasing a system capacity in a wireless communication system.

In accordance with an aspect of the present disclosure, a method is provided for a terminal in a wireless communication system. The method includes receiving identification information of a band designated for the terminal; receiving a data signal generated based on resource allocation information on the band and an OFDMA scheme; and demodulating and decoding the data signal based on the resource allocation information.

In accordance with another aspect of the present disclosure, a method is provided for a radio node in a wireless communication system. The method includes transmitting identification information of a band designated for a terminal; and transmitting a data signal generated based on resource allocation information on the band and an OFDMA scheme.

In accordance with another aspect of the present disclosure, a terminal is provided for use in a wireless communication system. The terminal includes a receiving unit that receives identification information of a band designated for the terminal, and receives a data signal generated based on resource allocation information on the band and an OFDMA scheme; and a controller that demodulates and decodes the data signal based on the resource allocation information.

In accordance with another aspect of the present disclosure, a radio node is provided for use in a wireless communication system. The radio node includes a transmitting unit that transmits identification information of a band designated for a terminal, and transmits a data signal generated based on resource allocation information on the hand and an OFDMA scheme.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 13 illustrates signal parameters in a wireless communication system, according to an embodiment of the present disclosure;

FIG. 14 illustrates signal parameters in a wireless communication system, according to an embodiment of the present disclosure;

FIG. 18 illustrates a configuration of resource allocation information in a wireless communication system, according to an embodiment of the present disclosure;

FIG. 25 illustrates user information in a wireless communication system, according to an embodiment of the present disclosure;

DETAILED DESCRIPTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Hereinafter, a disclosure will be made related to a technology for transmitting data signals in a wireless communication system. In particular, the present disclosure describes a technology for transmitting data signals in an OFDMA scheme.

In the following description, the terms referring to the control information, the terms referring to the network entities, the terms referring to the messages, or the terms referring to the elements of a device are used for the convenience of explanation. Therefore, the present disclosure is not limited to the terms used below, and other terms having the same or similar technical meaning may be used.

Although many of the terms and names used below are defined according to the IEEE 802.11 standard, the present disclosure is not limited to these terms and names, and may be applied to a system according to another standard in a same or similar manner.

Herein, the term " . . . unit" refers to a unit that performs one or more functions or operations, and may be implemented by hardware, software, or a combination thereof.

Figure 1:
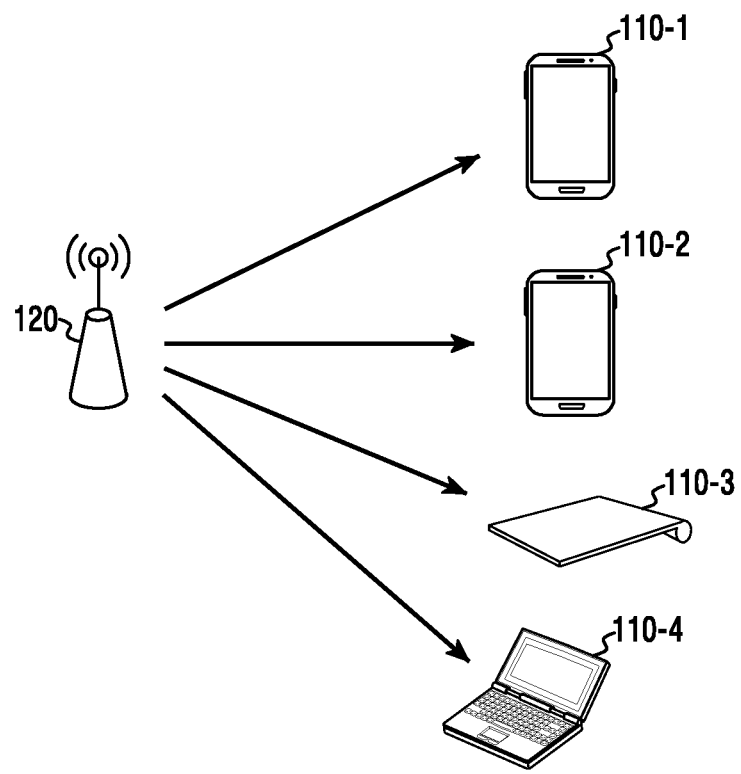
FIG. 1 illustrates a wireless communication system, according to an embodiment of the present disclosure.

FIG. 1 illustrates a wireless communication system, according to an embodiment of the present disclosure.

Referring to FIG. 1, terminals 1104 to 1104 communicate with a radio node 120. For example, each of the terminals 110-1 to 1104 may be a portable electronic device, such as a smart phone, a portable terminal, a mobile phone, a mobile pad, a media player, a tablet computer, a handheld computer, a Personal Digital Assistant (PDA), etc., or a combination of two or more of these devices. The radio node (or access point (AP)) 120 provides wireless connections to the terminals 1104 to 1104, and is connected to a backhaul network.

The terminals 110-1 to 1104 and the radio node 120 may constitute a wireless network. For example, the wireless network may be a wireless LAN (WLAN) that follows the IEEE 802.11 standard, and may be temporarily configured.

The radio node 120 may transmit a signal for a search or discovery, and may transmit a packet/frame/data unit including control information and data. The terminals 110-1 to 1104 may be connected to the radio node 120 in order to thereby receive a packet/frame/data unit transmitted from the radio node 120. The terminals 110-1 to 1104 may perform the communication in an MU-MIMO scheme.

According to the MU-MIMO scheme, the radio node 120 may support simultaneous wireless connections with respect to the terminals 110-1 to 110-4. However, with an increase in the number of users, a plurality of terminals may be allocated to a single radio node, e.g., dozens of terminals may be allocated to a single radio node in an area that is dense with users. Consequently, although a plurality of users should send independent signals at the same time, there is a limit in doing so using only the MU-MIMO scheme. For example, the number of supportable users is limited, and the reception performance and the system capacity are limited as well.

In addition, in order to increase the number of supportable users by using only the MU-MIMO scheme, additional resources, such as the number of antennas, or the amount of feedback, are greatly required.

According to an embodiment of the present disclosure, the terminals 110-1 to 110-4 may perform a multiple connection in the OFDMA scheme. That is, the radio node 120 may provide a multiple connection in the OFDMA scheme. Accordingly, the radio node 120 may transmit the control information about the OFDMA scheme, and may transmit data signals according to the OFDMA scheme.

In addition, the terminals 110-1 to 110-4 may receive the control information for the OFDMA scheme, and may receive data signals according to the OFDMA scheme. For example, the control information on the OFDMA scheme may include at least one of band designation information on the users, mapping information between a band index and a frequency band, and information on an encoding and modulating of a data signal.

Figure 2:
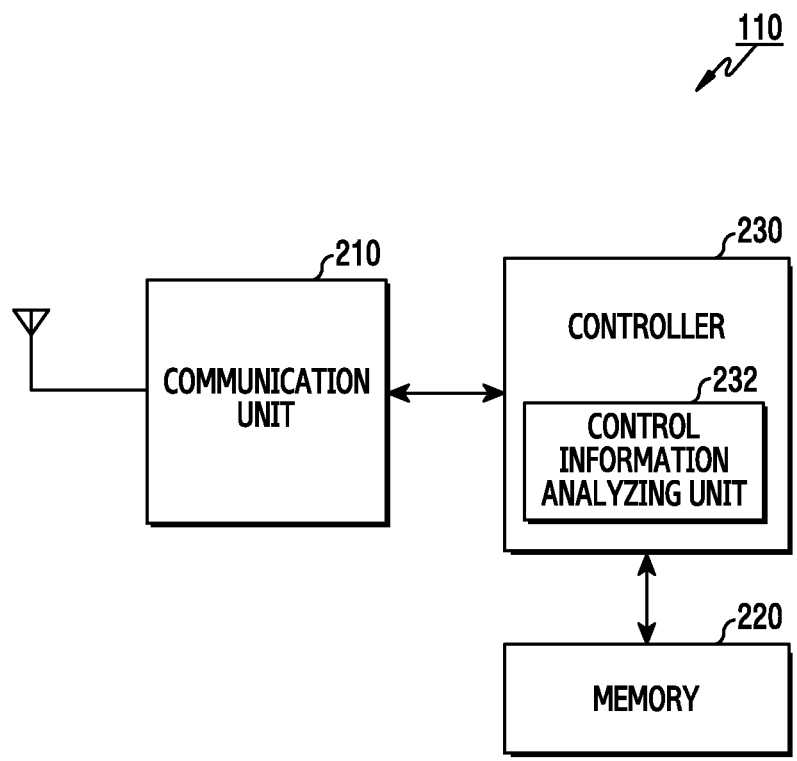
FIG. 2 illustrates a terminal in a wireless communication system, according to an embodiment of the present disclosure.

FIG. 2 illustrates a terminal in a wireless communication system, according to an embodiment of the present disclosure.

Referring to FIG. 2, the terminal includes a communication unit 210, a memory 220, and a controller 230.

The communication unit 210 transmits and receives signals through a wireless channel. For example, the communication unit 210 performs a function of conversion between a base band signal and a bit stream according to the physical layer specification of the system. When transmitting data, the communication unit 210 encodes and modulates a transmission bit stream to thereby generate complex symbols. In addition, when receiving the data, the communication unit 210 demodulates and decodes a base band signal to thereby restore a reception bit stream.

Further, the communication unit 210 up-converts the base band signal into a radio frequency (RF) band signal to be transmitted through the antenna, and down-converts the RF band signal received through the antenna into the base band signal. The communication unit 210 may include a transmission filter, a reception filter, an amplifier, a mixer, an oscillator, a digital to analog convertor (DAC), an analog to digital convertor (ADC), etc.

The communication unit 210 may analyze an OFDMA signal through the Fast Fourier Transform (HT) calculation, or the subcarrier demapping.

In addition, the communication unit 210 may include a plurality of RF chains.

The communication unit 210 may also perform the beamforming. For example, in order to perform the beamforming, the communication unit 210 may adjust a phase and a size of each signal transmitted and received through a plurality of antennas or antenna elements.

The communication unit 210 transmits and receives signals, and therefore, may be referred to as a transmitting unit, a receiving unit, or a transmitting/receiving unit.

In addition, in the following descriptions, the transmission and the reception through a radio channel may include at least one of above operations by the communication unit 210.

The memory 220 stores data, such as basic programs for the operation of the terminal, application programs, configuration information, etc. The memory 220 may be configured as a volatile memory, a non-volatile memory, or a combination thereof. In addition, the memory 220 provides the stored data according to a request from the controller 230.

The controller 230 controls overall operations of the terminal. For example, the controller 230 transmits and receives signals through the communication unit 210. In addition, the controller 230 records and reads the data in and from the memory 220.

The controller 230 may include one or more processors or microprocessors, or may be a part of a processor. In addition, a part of the communication unit 210 and controller 230 may be referred to as a communication processor (CP). The controller 230 includes a control information analyzing unit 232 that analyzes the control information related to the MU-MIMO and/or the OFDMA. That is, the controller 230 analyzes the control information on the MU-MIMO and the OFDMA, which is received from the radio node 120, and performs communication according to the MU-MIMO scheme and the OFDMA scheme. For example, the controller 230 may control the terminal to perform the procedures illustrated in FIG. 4, FIG. 5, FIG. 20, and FIG. 21, as will be described below.

Figure 3:
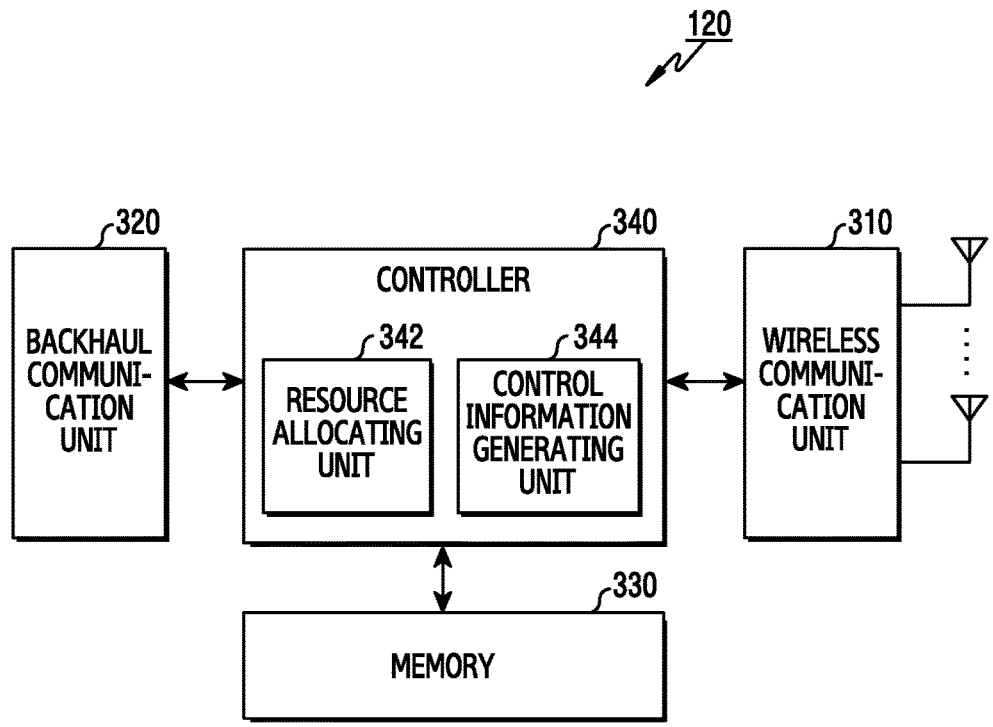
FIG. 3 illustrates a radio node in a wireless communication system, according to an embodiment of the present disclosure.

FIG. 3 illustrates a radio node in a wireless communication system, according to an embodiment of the present disclosure. Referring to FIG. 3, the radio node includes a wireless communication unit 310, a backhaul communication unit 320, a memory 330, and a controller 340.

The wireless communication unit 310 transmits and receives signals through a wireless channel. For example, the wireless communication unit 310 performs a function of conversion between a base band signal and a bit stream according to the physical layer specification of the system. When transmitting data, the wireless communication unit 310 encodes and modulates a transmission bit stream to thereby generate complex symbols. In addition, when receiving data, the wireless communication unit 310 demodulates and decodes a base band signal to thereby restore a reception bit stream.

Further, the wireless communication unit 310 up-converts the base band signal into an RF band signal to be transmitted through the antenna, and down-converts the RF band signal received through the antenna into the base band signal. The wireless communication unit 310 may include a transmission filter, a reception filter, an amplifier, a mixer, an oscillator, a DAC, an ADC, etc.

The wireless communication unit 310 may generate the OFDMA signal through the subcarrier mapping or the Inverse Fast Fourier Transform (IFFT) calculation.

In addition, the wireless communication unit 310 may include a plurality of RF chains.

Further, the wireless communication unit 310 may perform the beamforming. For example, in order to perform the beamforming, the wireless communication unit 310 may adjust a phase and a size of each signal transmitted and received through a plurality of antennas or antenna elements.

The wireless communication unit 310 transmits and receives signals, as described above, and therefore, may be referred to as a transmitting unit, a receiving unit, or a transmitting/receiving unit.

In addition, in the following description, the transmission and the reception through a radio channel may include at least one of above operations by the wireless communication unit 310.

The backhaul communication unit 320 provides an interface for performing communication with other nodes in a core network and a network. That is, the backhaul communication unit 320 converts a bit stream that is transmitted from the radio node to other nodes, e.g., other connection nodes, other radio nodes, or the core network, into a physical signal, and converts a physical signal received from other nodes into a bit stream. For example, the core network may include an Internet Protocol (IP) network.

The memory 330 stores the data, such as basic programs for the operation of the radio node, application programs, configuration information, etc. The memory 330 may be configured as a volatile memory, a non-volatile memory, or a combination thereof. In addition, the memory 330 provides the stored data according to a request from the controller 340.

The controller 340 controls overall operations of the radio node. For example, the controller 340 transmits and receives signals through the wireless communication unit 310 or the backhaul communication unit 320. In addition, the controller 340 records and reads data in and from the memory 330. The controller 340 may include at least one processor.

As illustrated in FIG. 3, the controller 340 includes a resource allocating unit 342 that performs the scheduling of at least one terminal according to at least one of the MU-MIMO scheme or the OFDMA scheme, and a control information generating unit 344 that generates the control information related to at least one of the MU-MIMO and the OFDMA. That is, the controller 340 may control the radio node to perform functions to support the MU-MIMO scheme and the OFDMA scheme, to generate and transmit the control information on the MU-MIMO scheme and the OFDMA scheme, and to perform the communication according to the MU-MIMO scheme and the OFDMA scheme. For example, the controller 340 may control the radio node to perform the procedures illustrated in FIG. 4, FIG. 6, FIG. 20, and FIG. 22, as will be described below.

Figure 4:
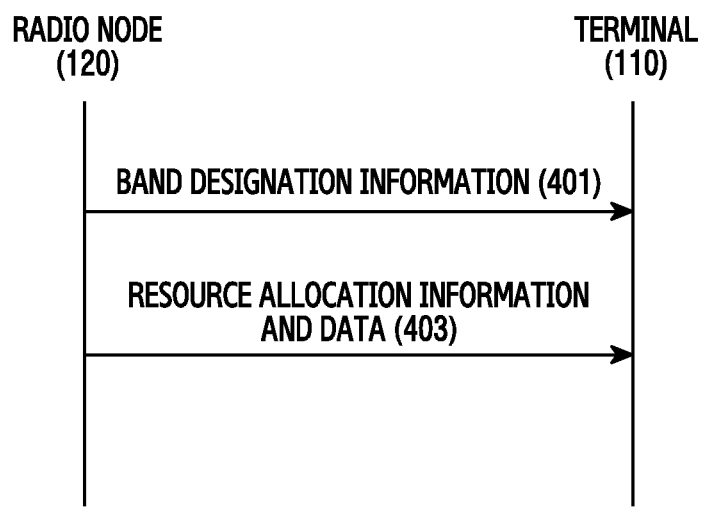
FIG. 4 illustrates a signal exchange between a terminal and a radio node in a wireless communication system, according to an embodiment of the present disclosure.

FIG. 4 illustrates a signal exchange between a terminal and a radio node in a wireless communication system, according to an embodiment of the present disclosure.

Referring to FIG. 4, in step 401, a radio node 120 transmits the band designation information to a terminal 110. The band designation information shows identification information on a band that is to be allocated to the terminal 110. For example, the band designation information may include a band index that is assigned to the terminal 110.

The band designation information is intended to distinguish between bands assigned to terminals that belong to the same group, and a frequency, to which the designated band is allocated, is identified by the resource allocation information that is received later. For example, the identification information may include an index to distinguish between the bands that are used in the group to which the terminal belongs.

Herein, the band identification information may also be referred to as a "user band," or a "frequency division (FD) index."

The band designation information may also include information indicating a group to which the terminal 110 belongs, and information for identifying the terminal 110 in the group. For example, the radio node 120 may transmit information indicating a group to which the terminal 110 belongs, and information for identifying the terminal 110 in the group.

In step 403, the radio node 120 transmits resource allocation information and data to the terminal 110.

The resource allocation information may include the information indicating a frequency band that is mapped with the band index allocated to the terminal 110, information indicating a bandwidth of the band designated to the terminal 110, and one or more parameters for demodulating and decoding the data signal by the terminal 110. The one or more parameters may be configured for each user, or may be divided into per-user parameters and per-band parameters:

In addition, the data may be transmitted according to the OFDMA scheme. For example, the data may be included in a frame or a protocol data unit (PDU), which is transmitted to a group including a plurality of terminals including the terminal 110.

Figure 5:
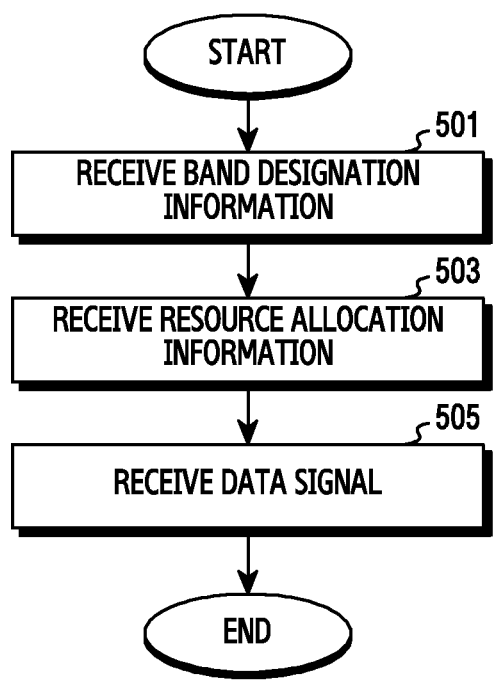
FIG. 5 is a flowchart illustrating an operation of a terminal in a wireless communication system, according to an embodiment of the present disclosure.

FIG. 5 is a flowchart illustrating an operation of a terminal in a wireless communication system, according to an embodiment of the present disclosure.

Referring to FIG. 5, in step 501, the terminal receives the band designation information from the radio node 120. As described above, the band designation information identifies a band that is to be allocated to the terminal. For example, the band designation information may include a band index that is designated to the terminal. Further, the band designation information may include information indicating a group to which the terminal belongs, and information for identifying the terminal in the group:

In step 503, the terminal receives resource allocation information including control information on an OFDMA scheme. For example, the resource allocation information may include information indicating a frequency band that is mapped with a band index allocated to the terminal, information indicating a bandwidth of the band designated to the terminal, and one or more parameters for demodulating and decoding a data signal by the terminal. As described above, the one or more parameters may be configured for each user, or may be divided into per parameters and per-band parameters.

In step 505, the terminal receives a data signal including one or more OFDMA symbols. All of or some of a plurality of subcarriers constituting one or more OFDMA symbols may deliver the data to the terminal.

Specifically, the terminal may demodulate and decode the signal, which is mapped with the subcarrier in the frequency band that is identified through the resource allocation information, among the data signals according to the parameters identified through the resource allocation information in order to receive the data.

The resource allocation information received in step 503 and the data signal received in step 505 may be included in a single frame or PDU.

Figure 6:
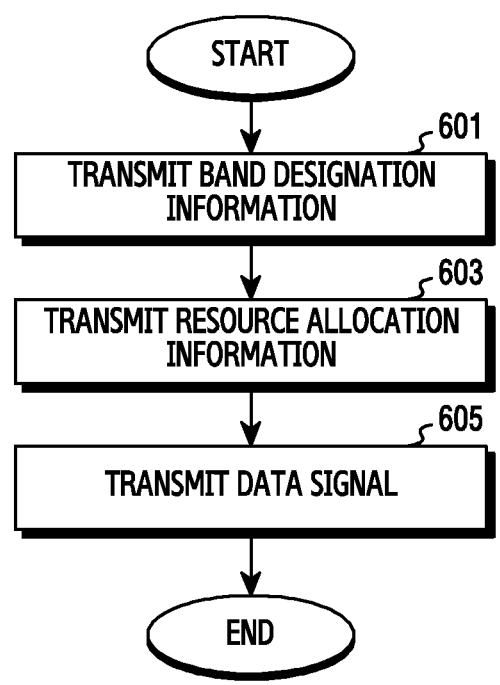
FIG. 6 is a flowchart illustrating an operation of a radio node in a wireless communication system, according to an embodiment of the present disclosure.

FIG. 6 is a flowchart illustrating an operation of a radio node in a wireless communication system, according to an embodiment of the present disclosure.

Referring to FIG. 6, in step 601, the radio node transmits band designation information to a terminal. The band designation information identifies a band that is to be allocated to the terminal. For example, the band designation information may include a band index that is assigned to the terminal. Further, the band designation information may include information indicating a group to which the terminal belongs, and information for identifying the terminal in the group.

Additionally, the radio node may also transmit band designation information to one or more other terminals.

In step 603, the radio node transmits resource allocation information to the terminal. The resource allocation information includes control information on an OFDMA scheme. For example, the resource allocation information may include information indicating a frequency band that is mapped with a band index that is allocated to the terminal, information indicating a bandwidth of the band that is allocated to the terminal, and one or more parameters for demodulating and decoding a data signal by the terminal. The one or more parameters may be configured for each user, or may be divided into per-user parameters and per-band parameters.

Additionally, resource allocation information for one or more other terminals may also be transmitted.

In step 605, the radio node transmits a data signal including one or more OFDMA symbols. All of or some of a plurality of subcarriers constituting one or more OFDMA symbols may deliver the data to the terminal. That is, one or more OFDMA symbols may include data for one or more terminals in the same group as the terminal.

The resource allocation information transmitted in step 603 and the data signal transmitted in step 605 may be included in a single frame or PDU.

Figure 7:
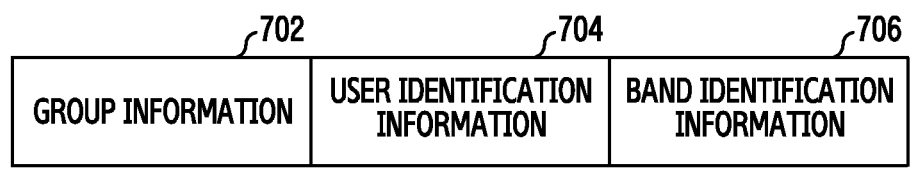
FIG. 7 illustrates a configuration of band designation information in a wireless communication system, according to an embodiment of the present disclosure.

FIG. 7 illustrates a configuration of band designation information in a wireless communication system, according to an embodiment of the present disclosure. For example, the band designation information illustrated in FIG. 7 may be transmitted in step 401 of FIG. 4.

Referring to FIG. 7, the band designation information includes group information 702, user identification information 704, and band identification information 706.

The group information 702 includes information on a group to which a terminal that receives the band designation information belongs. For example, the group information 702 may indicate the group to which the terminal belongs and may be referred to as a "membership status array."

The user identification information 704 includes information for identifying the terminal in the group to which the terminal belongs. For example, the user identification information 704 may include a user index of the terminal. The index included in the user identification information 704 uniquely identifies the corresponding terminal in a single group. For example, the user identification information 704 indicates a terminal number of the corresponding user when receiving the signal in the MU-MIMO scheme. The user identification information 704 may also be referred to as a "user position array."

The band identification information 706 indicates a band that is allocated to the terminal. The band identification information 706 may include a band index or identifier assigned to the terminal. For example, when using an OFDMA scheme, the band identification information 706 indicates a band through which the user receives a signal. The band identification information 706 may also be referred to as a "user band array."

A system according to an embodiment of the present disclosure may support the OFDMA scheme through the band identification information.

The group information 702, the user identification information 704, and the band identification information 706 may be configured in the form of an array or bitmap. Accordingly, the values corresponding to each group that is included in the group information 702, the user identification information 704, and the band identification information 706 may be referred to as sub-fields. Consequently, the group information 702, the user identification information 704, and the band identification information 706 may include as many sub-fields as the number of supportable groups.

If a system according to an embodiment of the present disclosure follows the IEEE 802.11 standard, the band designation information may be defined as an action frame in a high efficiency WLAN (HEW) category, and may be referred to as an "extended group identifier (ID) management frame." In this case, the band designation information may further include the information, such as a category, or HEW action.

Figure 8:
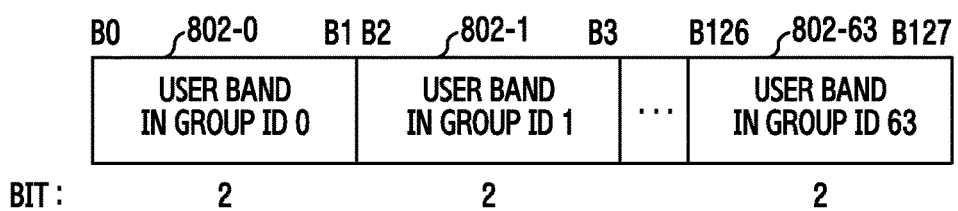
FIG. 8 illustrates a configuration of band identification information in a wireless communication system, according to an embodiment of the present disclosure.

FIG. 8 illustrates a configuration of band identification information in a wireless communication system, according to an embodiment of the present disclosure. For example, the band identification information illustrated in FIG. 8 may be used as the band identification information 706 of FIG. 7.

Referring to FIG. 8, the band identification information includes values corresponding to different groups. That is, each value included in the band identification information corresponds to a group ID. The number of bits of each value varies with the number of allocable bands. In FIG. 8, it is assumed that 64 MU-MIMO groups and four allocable bands are provided. Accordingly, the band identification information includes 64 sub-fields 802-0 to 802-63, and each sub-field has a size of 2 bits.

If the sub-field (e.g., the membership status sub-field) of a specific group ID in the group information has a positive value (for example, 1), the corresponding sub-field the user band sub-field) in the band identification information is configured to include the identification information. That is, if the corresponding terminal belongs to the group of the specific group ID, the sub-field corresponding to the specific group ID in the band identification information has at least one value. For example, the band index according to a configuration value may be defined as shown in Table 1 below.

TABLE 1

| Sub-field value of band identification information | Band index |
| --- | --- |
| 00 | 0 |
| 01 | 1 |
| 10 | 2 |
| 11 | 3 |

However, if the sub-field (e.g., the membership status sub-field) of a specific group ID in the group information has a negative value (for example, 0), the corresponding sub-field in the band identification information is reserved. That is, if the corresponding terminal does not belong to the group of the specific group ID, the sub-field corresponding to the specific group ID in the band identification information may not be used.

Figure 9:
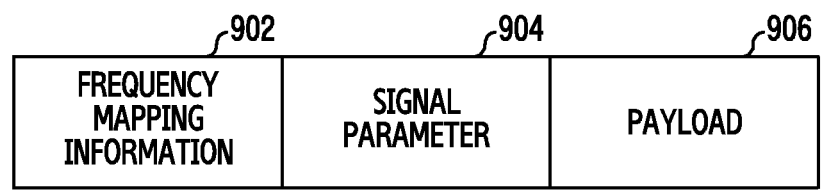
FIG. 9 illustrates a configuration of resource allocation information and data in a wireless communication system, according to an embodiment of the present disclosure.

FIG. 9 illustrates a configuration of resource allocation information and data in a wireless communication system, according to an embodiment of the present disclosure. For example, the configuration of the resource allocation information and the data illustrated in FIG. 9 may be transmitted in step 403 of FIG. 4.

Referring to FIG. 9, the resource allocation information and the data may be transmitted as a single transmission unit. The transmission unit may be referred to as a "frame," or a "PDU."

The frequency mapping information 902 includes information for receiving the data included in the payload 906. For example, the frequency mapping information 902 may include information indicating whether or not the bands are used, mapping information between the band index and the frequency band, or information related to the encoding and the modulation with respect to the data signal. The frequency mapping information 902 may also be referred to as "HEW-SIG (signal)-A."

The signal parameter 904 includes parameters applied to the data signal transmitted through the payload 906. For example, the signal parameter 904 includes one or more control parameters, such as the encoding and modulating scheme, the beamforming and space-time block coding (STBC)-related information, or the number of streams, for restoring the data signal.

The signal parameters 904 may include one or more fields. For example, the signal parameters 904 may also be referred to as "HEW-SIG-B," or "HEW-SIG-B" and "HEW-SIG-C."

The payload 906 includes data. For example, the payload 906 may include a data signal configured in an OFDMA scheme.

The data signal transmitted through the payload 906 may be generated, demodulated, and decoded according to the indication of the frequency mapping information 902 and the signal parameters 904.

Figure 10:
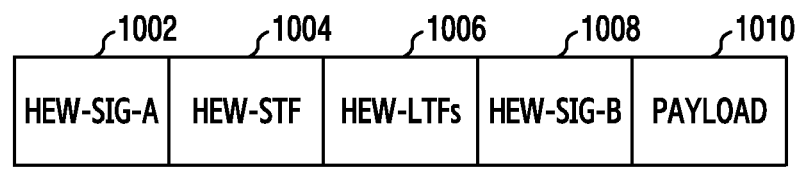
FIG. 10 illustrates a data unit including resource allocation information and data in a wireless communication system, according to an embodiment of the present disclosure.

FIG. 10 illustrates a data unit including resource allocation information in a wireless communication system, according to an embodiment of the present disclosure. For example, FIG. 10 illustrates an example in which the resource allocation information and the data can be applied to the IEEE 802.11 standard.

Referring to FIG. 10, the data unit includes HEW-SIG-A 1002, HEW-STF (short training field) 1004, HEW-LIT (long training field) 1006, HEW-SIG-B 1008, and a payload 1010. The HEW-SIG-A 1002 includes the control information that is transmitted to the terminal in common. That is, the HEW-SIG-A 1002 corresponds to the frequency mapping information 902 of FIG. 9, and includes the control information that can be applied in common to the terminals of the same group.

The HEW-STF 1004 and HEW-LTF 1006 include at least one sequence for the frame detection, the synchronization, or the channel estimation. The HEW-SIG-B 1008 transfers the control information that is separated for each user. Accordingly, the HEW SIG-B 1008 corresponds to the signal parameters 904 of FIG. 9, and includes the information that is applied to each terminal.

The payload 1010 contains the data.

Figure 11:
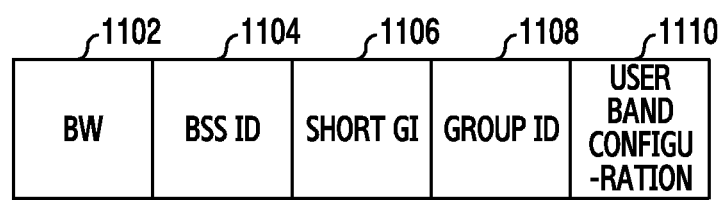
FIG. 11 illustrates frequency mapping information in a wireless communication system, according to an embodiment of the present disclosure.

FIG. 11 illustrates frequency mapping information in a wireless communication system, according to an embodiment of the present disclosure. For example, the frequency mapping information illustrated in FIG. 11 will be described with reference to the HEW-SIG-A 1002 as illustrated in FIG. 10.

Referring to FIG. 11, the HEW-SIG-A 1002 corresponding to the frequency mapping information 902 includes a bandwidth (BW) 1102, a basic service set (BSS) ID 1104, a short guard interval (GI) 1106, a group ID 1108, and user band configuration (UBC) 1110. The BW 1102 denotes the bandwidth of the signal, and the BSS ID 1104 denotes the identification information on the wireless network of the corresponding radio node. The short GI 1106 represents the type of time interval to be applied to the frame, and the group ID 1108 represents the identification information on the group. Although not illustrated in FIG. 11, the HEW-SIG-A 1002 may further include information indicating a number of OFDM symbols of the HEW-SIG-B 1008.

The user band configuration 1110 is used to map the subcarrier frequency bands, which are divided to transfer the data to be transmitted to each terminal, with the band indexes when using the OFDMA scheme. The frequency band may also be referred to as a "frequency channel" or a "channel."

The user band configuration 1110 represents the mapping relationship between the frequency band and the band index. For example, if the radio node transmits signals in a frequency band of 40 MHz, the radio node may allocate the first 20 MHz band to one or more terminals that use the band index #0, and may allocate the next 20 MHz band to one or more terminals that use the band index #1. Alternatively, the radio node may divide the 40 MHz band into four frequency bands of 10 MHz, and may allocate the frequency bands to the band indexes #0, #1, #2, and #3, respectively.

Accordingly, a portion of the user configuration 1110 may indicate whether or not each frequency band is allocated, and another portion thereof may indicate which band index is mapped with each frequency band.

Figure 12:
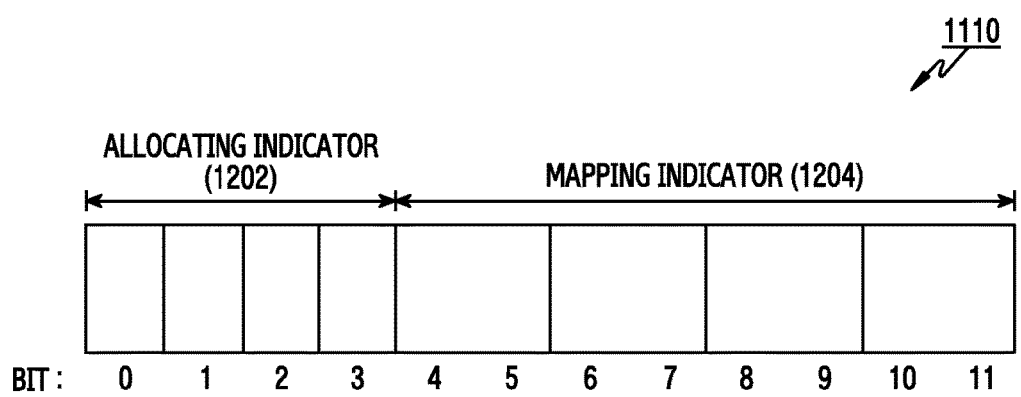
FIG. 12 illustrates user band configuration information in a wireless communication system, according to an embodiment of the present disclosure.

FIG. 12 illustrates user band configuration information in a wireless communication system, according to an embodiment of the present disclosure. For example, the user band configuration information illustrated in FIG. 12 may be used as the user band configuration 1110 as illustrated in FIG. 11.

Referring to FIG. 12, the user band configuration includes an allocating indicator 1202 and a mapping indicator 1204. The allocating indicator 1202 indicates whether or not each frequency band is used, and the mapping indicator 1204 indicates which band index is mapped with each frequency band.

More specifically, the bits #0 to #3 of the user band configuration are used as indicators as to whether or not the resource is allocated to each sub-band that is obtained by dividing the whole bandwidth, e.g., of the HEW-SIG-A 1002, by a minimum unit of resource allocation, and the bits #4 to #11 thereof indicate the band index to which each sub-band is allocated. If the number of allocated bands increases, or if the minimum unit of resource allocation of the bandwidth varies, the number of bits constituting each item may be changed.

In addition, the user band configuration may be encoded.

Figure 13:
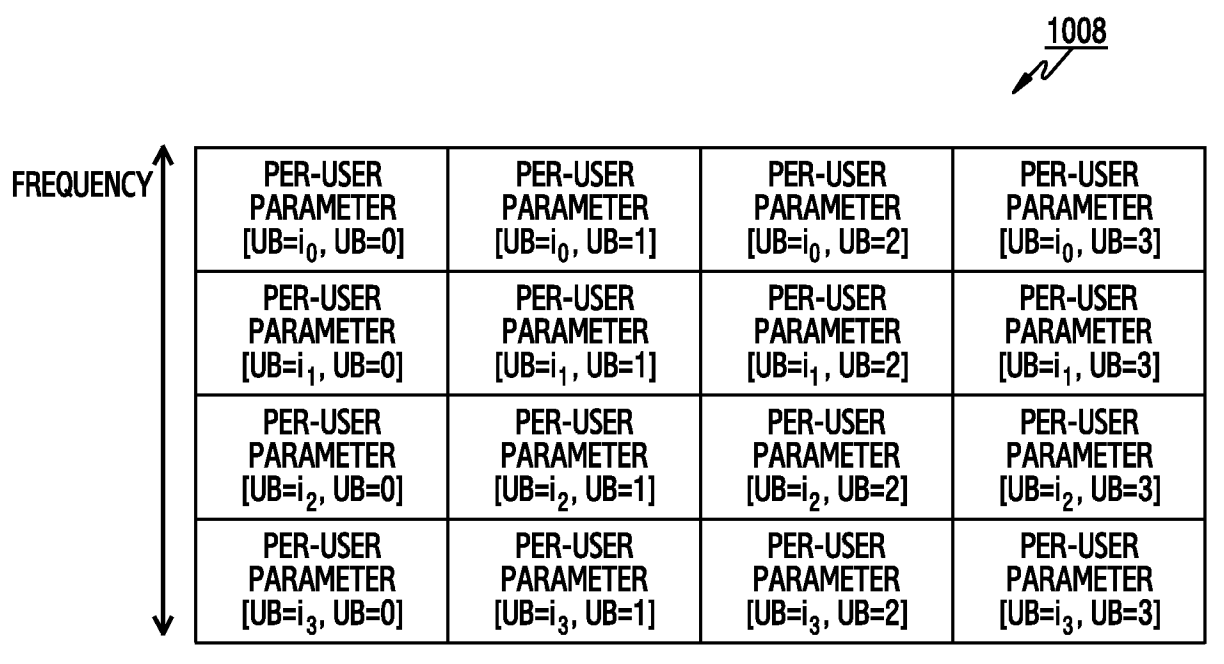

FIG. 13 illustrates signal parameters in a wireless communication system, according to an embodiment of the present disclosure. For example, the HEW-SIG-B 1008 of FIG. 10 may be configured as illustrated in FIG. 13.

Specifically, FIG. 13 illustrates four band indexes $i_0$, $i_1$, $i_2$, and $i_3$, where the MU-MIMO of up to 4-users is supported. Further, "UB" is a variable that indicates the band index, and "UP" is a variable that indicates a user index in a group.

Referring to FIG. 13, the signal parameters include per-user parameters. The per-user parameters indicate at least one of a number of space-time-streams (N_STS), a coding scheme, an application of the STBC, an application of transmission beamforming (TxBF), or a modulation and coding scheme (MCS). Because the terminals that belong to the group corresponding to a single group ID share a band index and a user index through the band designation information, as illustrated in FIG. 7, the radio node may transfer the control parameter for a specific terminal through the corresponding position of the HEW-SIG-B 1008 by using the band index and the user index. Likewise, each terminal may receive its own control parameter at the corresponding position through the HEW-SIG-B 1008.

FIG. 14 illustrates signal parameters in a wireless communication system, according to an embodiment of the present disclosure. For example, the HEW-SIG-a 1008 of FIG. 10 may be configured as illustrated in FIG. 14.

Specifically, FIG. 14 illustrates four band indexes $i_0$, $i_1$, $i_2$, and $i_3$, where the MU-MIMO of up to 4-users is supported. Further, "UB" is a variable that indicates the band index, and "UP" is a variable that indicates a user index in a group.

Referring to FIG. 14, the signal parameters include per-band parameters and per-user parameters. Compared to the embodiment of FIG. 13, the information that can be applied to the bands in common in the per-user parameters of FIG. 13 is configured as per-band parameters in FIG. 14. That is, in FIG. 14, the per-band parameters include the information that is useful only to the terminal that is allocated to the corresponding band in each band, or the information that is used for the terminals that are allocated to the corresponding band in common. The per-band parameters indicate at least one of the application of the STBC, the application of beamforming, or an index indicator for an active station. The index indicator shows whose information is transmitted among the users who are allocated to the corresponding band in each band. Therefore, it can be determined whether or not the information is transmitted to the terminal of which the user index value is "m" through the m+1-th bit in the index indicator. The per-user parameters of FIG. 14 may indicate at least one of the number of space-time streams, the coding scheme, or the MCS.

Using the control information described above, communication in the MU-MIMO scheme and the OFDMA scheme may be performed.

Group assignment with respect to terminals may be performed through the control information (e.g., extended group ID management frame), as illustrated in FIG. 7, before the radio node transmits the HEW MU physical layer convergence protocol (PLOP) PDU (PPDU).

If the k-th sub-field value of the group information 702 (e.g., the membership status array) of the terminal that has received the extended group ID management frame is a positive value (for example, 1), the terminal determines that it belongs to the group #k, and identifies its own index in the group #k through the k-th user identification information 704 (e.g., the user position array) and the band identification information 706 (e.g., the user band array).

If the user index and the band index, which have been identified by the terminal, are "UserPositionInGroupID[k]," and "UserBandInGroupID[k]" respectively, the radio node determines the OFDMA band to which "UserBandInGroupD[k]" is to be allocated (n→$i_n$) according to the band configuration configured in the user band configuration 1110, and transmits the information on the terminals that are allocated to the corresponding band in order of "UserPositionInGroupID[k]."

When the terminal receives the HEW MU PPDU in which the value of the group ID 1108 in the HEW-SIG-A 1002 is "k," the terminal analyzes that the value that is configured in "Per-user Para [UB=i (UserBandInGroupID[k]), UP=UserPositionInGroupID[k]]" is its own parameter, and may receive the payload data of the corresponding frequency band.

Figure 15:
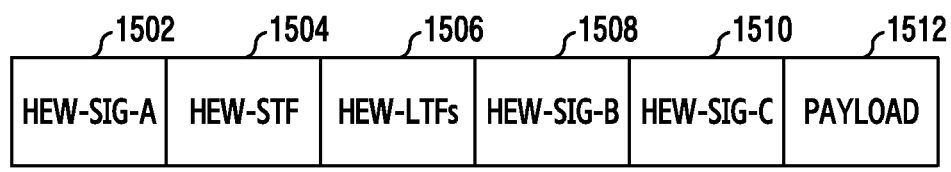
FIG. 15 illustrates a data unit including resource allocation information and data in a wireless communication system, according to an embodiment of the present disclosure.

FIG. 15 illustrates a data unit including resource allocation information and data in a wireless communication system, according to an embodiment of the present disclosure. For example, the configuration illustrated in FIG. 15 may be used for the frequency mapping information and the data illustrated in FIG. 9.

Specifically, FIG. 15 illustrates an example in which frequency mapping information and data are configured to be applied to the IEEE 802.11 standard.

Referring to FIG. 15, the data unit includes HEW-SIG-A 1502, HEW-STF 1504, HEW-LTF 1506, HEW-SIG-B 1508, HEW-SIG-C 1510, and a payload 1512. Similar to FIG. 10, the HEW-SIG-A 1502 includes control information transmitted in common to the terminals, and the HEW-STF 1504 and HEW-LTF 1506 include at least one sequence for frame detection, synchronization, and/or channel estimation. The payload 1512 includes the data.

The HEW-SIG-B 1508 and the HEW-SIG-C 1510 include similar parameters that are included in the HEW-SIG-B 1008 of FIG. 10. That is, some of the parameters included in the HEW-SIG-B 1008 of FIG. 10 may be included in the HEW-SIG-B 1508, and others thereof may be included in the HEW-SIG-C 1510.

One or more parameters included in the HEW-SIG-C 1510 may be transmitted in the MU-MIMO scheme, thereby reducing overhead. For example, the MCS for each terminal may be transmitted in the MU-MIMO scheme through the HEW-SIG-C 1510. As such, the MCS parameters for each terminal may be spatially multiplexed through the HEW-SIG-C 1510. In this case, the overhead is less than when the MCSs of all of the terminals are transmitted through different resources.

Further, the HEW-SIG-C 1510 may also include the control information, such as MPDU length. That is, the HEW-SIG-C 1510 may have characteristics similar to the VHT (very high throughput)-SIG-B of the IEEE 802.11ac.

Figure 16:
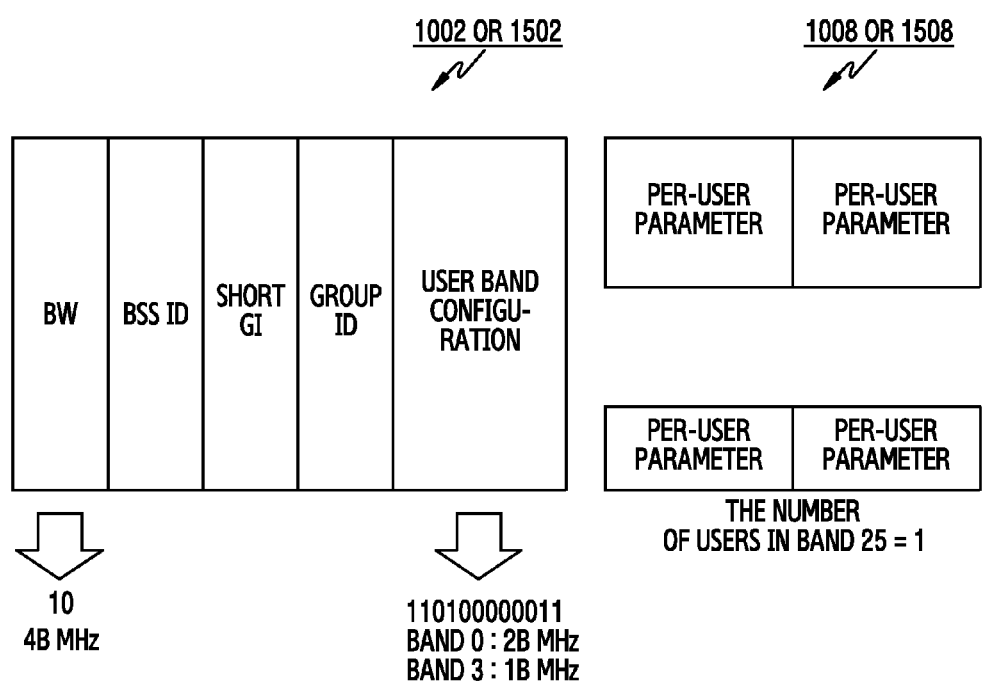
FIG. 16 illustrates a configuration of resource allocation information in a wireless communication system, according to an embodiment of the present disclosure.

FIG. 16 illustrates a configuration of resource allocation information in a wireless communication system, according to an embodiment of the present disclosure. Specifically, FIG. 16 illustrates a single terminal being allocated to each band, and an OFDMA scheme being used without applying an MU-MIMO scheme.

Referring to FIG. 16, a user band configuration, e.g., the user band configuration 1110 of the HEW-SIG-A 1002 or 1502, is configured to be "110100000011." "1101" corresponding to the allocating indicator 1202 indicates that the frequency bands #0, #1, and #3 are used. "00000011" corresponding to the mapping indicator 1204 indicates that the frequency bands #0 and #1 are mapped with the band index #0, and the frequency band #3 is mapped with the band index #3. Accordingly, the band #0 is allocated with 2 B MHz, and the band #3 is allocated with B MHz. Here, 'B' is the minimum frequency allocation unit. For example, 'B' may be defined as multiples of 20 (e.g., 20, 40, etc.).

Accordingly, the HEW-SIG-B 1008 or 1508 includes one or more per-user parameters with respect to the band #0, and one or more per-user parameters with respect to the band #3.

Figure 17:
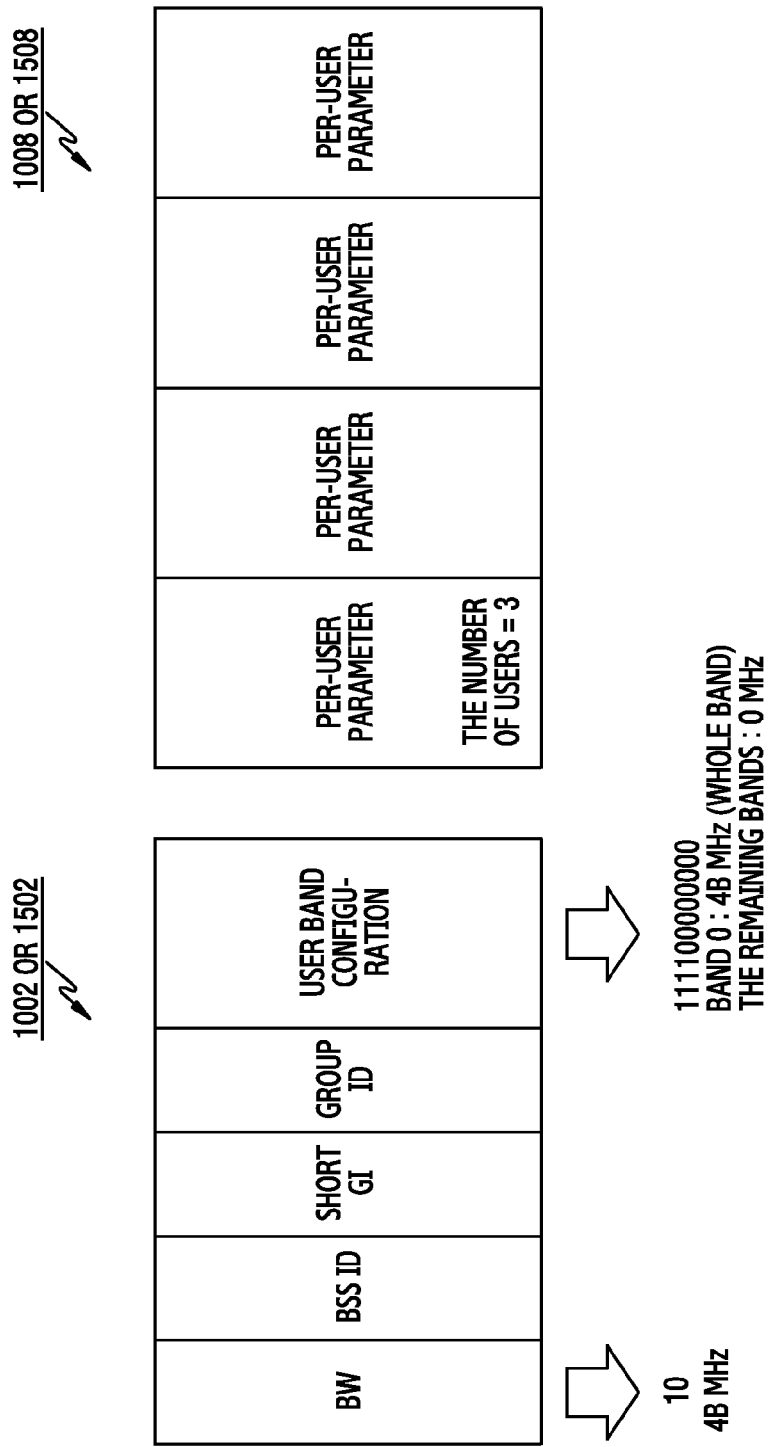
FIG. 17 illustrates a configuration of resource allocation information in a wireless communication system, according to an embodiment of the present disclosure.

FIG. 17 illustrates a configuration of resource allocation information in a wireless communication system, according to an embodiment of the present disclosure. Specifically, FIG. 17 illustrates a signal being transmitted in an MU-MIMO scheme, without using an OFDMA scheme.

Referring to FIG. 17, a user band configuration, e.g., the user band configuration 1110 of the HEW-SIG-A 1002 or 1502, is configured to be "111100000000." "1111" corresponding to the allocating indicator 1202 indicates that the frequency bands #0, #1, #2, and #3 are used. "00000000" corresponding to the mapping indicator 1204 indicates that the frequency bands #0, #1, #2, and #3 are mapped with the band index #0. Accordingly, the band #0 is allocated with 4

B MHz. Here, 'B' is the minimum frequency allocation unit. For example, 'B' may be defined as multiples of 20 (e.g., 20, 40, etc.). All frequency bands are mapped with a single band index, and three users use the band index #0.

Accordingly, the HEW-SIG-B 1008 or 1508 includes the per-band parameters with respect to the band #0 and the groups of three per-user parameters.

As described above, the number of bands and the configuration thereof are designated by the HEW-SIG-A 1002 or 1502, and the information on each frequency band included in the HEW-SIG-B 1008 or 1508 includes only the information for the MU-MIMO transmission to the terminals that use the corresponding band.

FIG. 18 illustrates a configuration of resource allocation information in a wireless communication system, according to an embodiment of the present disclosure. Specifically, FIG. 18 illustrates four terminals being allocated to each of four bands so that sixteen terminals are provided with a service.

Referring to FIG. 18, a user band configuration, e.g., the user band configuration 1110 of the HEW-SIG-A 1002 or 1502, is configured to be "111100110110." "1111" corresponding to the allocating indicator 1202 indicates that the frequency bands #0, #1, #2, and #3 are used. "00110110" corresponding to the mapping indicator 1204 indicates that: the frequency band #0 is mapped with the band index #0; the frequency band #1 is mapped with the band index #3; the frequency band #2 is mapped with the band index #1; and the frequency band #3 is mapped with the band index #2. Accordingly, each of the band indexes #0, #1, #2, and #3 is allocated with B MHz. Here, 'B' is the minimum frequency allocation unit. For example, 'B' may be defined as multiples of 20 (e.g., 20, 40, etc.).

Accordingly, the HEW-SIG-B 1008 or 1508 includes the groups of four per-user parameters with respect to each of the band indexes #0, #1, #2, and #3.

Figure 19:
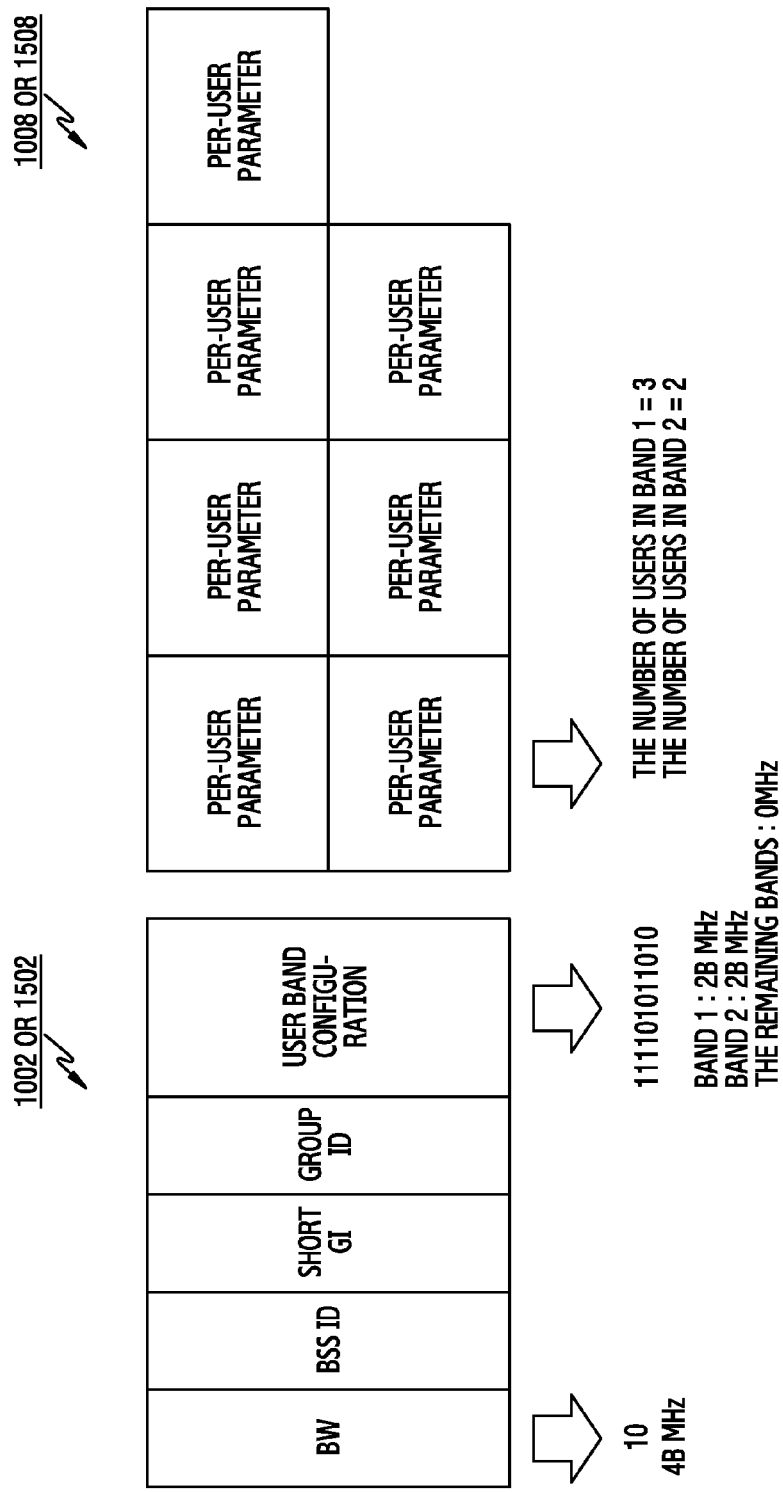
FIG. 19 illustrates a configuration of resource allocation information in a wireless communication system, according to an embodiment of the present disclosure.

FIG. 19 illustrates a configuration of resource allocation information in a wireless communication system, according to an embodiment of the present disclosure. Specifically, FIG. 19 illustrates a different number of terminals being allocated to each band.

Referring to FIG. 19, a user band configuration, e.g., the user band configuration 1110 of the HEW-SIG-A 1002 or 1502, is configured to be "111101011010." "1111" corresponding to the allocating indicator 1202 indicates that the frequency bands #0, #1, #2, and #3 are used. "01011010" corresponding to the mapping indicator 1204 indicates that the frequency bands #0 and #1 are mapped with the band index #1, and the frequency bands #2 and #3 are mapped with the band index #2. Accordingly, the band index #1 is allocated with 2 B MHz, and the band index #2 is allocated with 2 B MHz. Here, 'B' is the minimum frequency allocation unit. For example, 'B' may be defined as multiples of 20 (e.g., 20, 40, etc.).

Accordingly, the HEW-SIG-B 1008 or 1508 includes one or more per-user parameters with respect to each of the band indexes #1 and #2. The HEW-SIG-B 1008 or 1508 includes the groups of four per-user parameters with respect to the band #1, and the groups of three per-user parameters with respect to the band #2. Accordingly, the number of terminals that participate in the MU-MIMO transmission may be different according to the bands.

As described above, a radio node may transmit data to one or more terminals belonging to the same group including a terminal by using the MU-MIMO scheme and the OFDMA scheme. The method of performing the communication with the terminals included in the group may be referred to as the group ID (GID)-based scheme.

According to another embodiment of the present disclosure, without the definition of the group, the MU-MIMO scheme and the OFDMA scheme may be supported. The method of performing the communication without the group may be referred to as an Association ID (AID)-based scheme. Hereinafter, a description will be made of embodiments that perform the communication without a group by using the OFDMA scheme.

Figure 20:
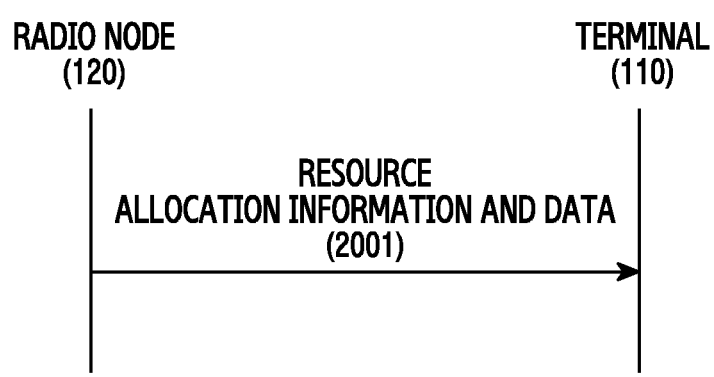
FIG. 20 illustrates a signal exchange between a terminal and a radio node in a wireless communication system, according to an embodiment of the present disclosure.

FIG. 20 illustrates a signal exchange between a terminal and a radio node in a wireless communication system, according to an embodiment of the present disclosure.

Referring to FIG. 20, in step 2001, the radio node 120 transmits the resource allocation information and the data to the terminal 110. The resource allocation information may include information on the terminals to be multiplexed, information on a frequency band to be mapped with a band designated for the terminal 110, information on a bandwidth of the band designated for the terminal 110, or one or more parameters for demodulating and decoding the data signal by the terminal 110. The one or more parameters may be configured for each user, or may be divided into common parameters and per-user parameters. In addition, the data may be transmitted according to the OFDMA scheme. For example, the data may be included in the frame or the PDU, which is transmitted to the group that includes a plurality of terminals including the terminal 110.

Figure 21:
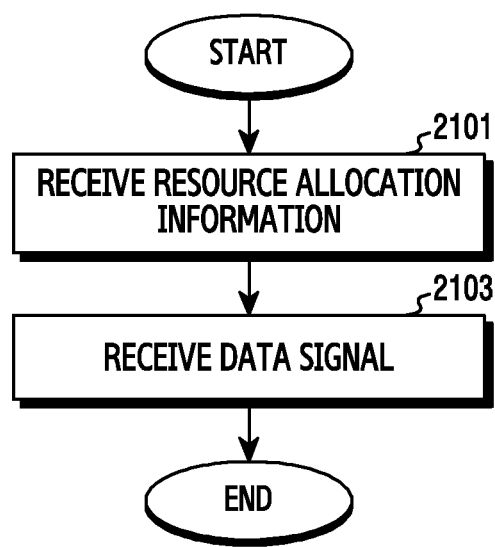
FIG. 21 is a flowchart illustrating an operation of a terminal in a wireless communication system, according to an embodiment of the present disclosure.

FIG. 21 is a flowchart illustrating an operation of a terminal in a wireless communication system, according to an embodiment of the present disclosure. Referring to FIG. 21, in step 2101, the terminal receives resource allocation information including the control information for the OFDMA scheme. The resource allocation information may also include information on the terminals to be multiplexed, information on a frequency band to be mapped with a band designated for a terminal, information on a bandwidth of the band designated for the terminal, or one or more parameters for demodulating and decoding the data signal by the terminal. The one or more parameters may be configured for each user, or may be divided into common parameters and per-user parameters.

In step 2103, the terminal receives a data signal including one or more OFDMA symbols. All of or some of a plurality of subcarriers constituting one or more OFDMA symbols may deliver the data to the terminal. Thus, the terminal may demodulate and decode the signal that is mapped with the subcarrier in the frequency band that is identified through the resource allocation information among the data signals in order to thereby receive the data.

The resource allocation information received in step 2101 and the data signal received in step 2103 may be included in a single frame or PDU.

Figure 22:
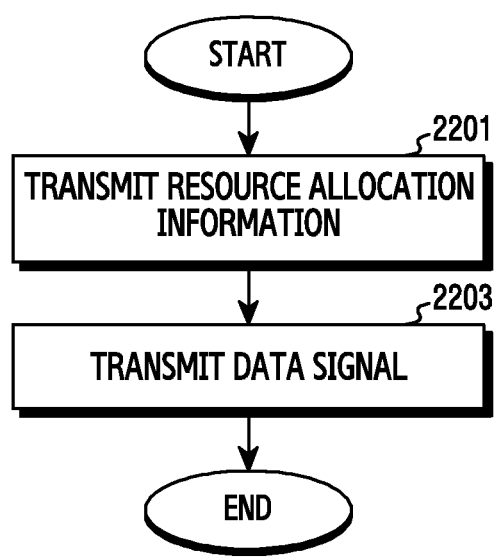
FIG. 22 is a flowchart illustrating an operation of a radio node in a wireless communication system, according to an embodiment of the present disclosure.

FIG. 22 is a flowchart illustrating an operation of a radio node in a wireless communication system, according to an embodiment of the present disclosure.

Referring to FIG. 22, in step 2201, the radio node transmits resource allocation information to a terminal. The resource allocation information includes control information for an OFDMA scheme. The resource allocation information may also include information on the terminals to be multiplexed, information on a frequency band to be mapped with a band designated for the terminal, information on a bandwidth of the band designated for the terminal, or one or more parameters for demodulating and decoding the data signal by the terminal.

The one or more parameters may be configured for each user, or may be divided into common parameters and per-user parameters.

Additionally, the resource allocation information for one or more of the other terminals may also be transmitted as well.

In step 2203, the radio node transmits a data signal including one or more OFDMA symbols. All of or some of a plurality of subcarriers constituting one or more OFDMA symbols may deliver the data to the terminal. That is, one or more OFDMA symbols may include the data for one or more terminals including the terminal.

The resource allocation information transmitted in step 2201 and the data signal transmitted in step 2203 may be included in a single frame or PDU.

Figure 23:
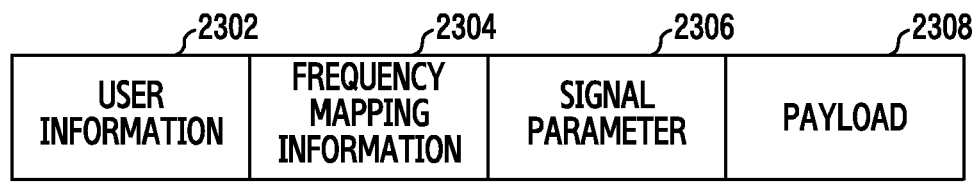
FIG. 23 illustrates a configuration of resource allocation information and data in a wireless communication system, according to an embodiment of the present disclosure.

FIG. 23 illustrates a configuration of resource allocation information and data in a wireless communication system, according to an embodiment of the present disclosure. For example, the configuration of the resource allocation information and the data illustrated in FIG. 23 may be transmitted in step 2001 of FIG. 20.

Referring to FIG. 23, the resource allocation information and the data may be transmitted as a single transmission unit. The transmission unit may be referred to as a "frame," or a "PDU."

The user information 2302 indicates terminals that are to receive data included in the payload 2308. More specifically, the user information 2302 includes identification information (e.g., AIDs) of the terminals that are to receive the data contained in the payload 2308.

In addition, the user information 2302 includes the information identifying the terminals that are to participate in an MU-MIMO transmission among the terminals.

Further, the user information 2302 indicates the band assigned to each terminal. However, if the payload 2308 includes the data with respect to only a single terminal, the user information 2302 may be omitted. The user information 2302 may be referred to as "HEW-SIG-A".

The frequency mapping information 2304 includes information for receiving the data contained in the payload 2308. For example, the frequency mapping information 2304 includes the mapping information between frequency bands and band indexes, such as user channel configuration (UCC) information.

More specifically, the frequency mapping information 2304 may include information as to whether or not the frequency bands are used, or the mapping information between the band and the frequency. With regard to the information as to whether or not the frequency bands are used, the use of each frequency band may be expressed by a configuration value of the bit or the toggling of the bit. In addition, the mapping information between the band and the frequency may be configured by expressing the mapping of each frequency band as a configuration value of the bit or the toggling of the bit. The frequency mapping information 2304 may be referred to as a "HEW-SIG-A2".

The signal parameters 2306 include the parameters applied to the data signal that is transmitted through the payload 2308. For example, the signal parameters 2306 include one or more control parameters, such as an encoding and modulation scheme, beamforming and STBC-related information, or a number of streams, for restoring the data signal. The signal parameters 2306 may be comprised of one or more fields (e.g., the common parameters for a plurality of users and the per-user parameters thereof). For example, the signal parameters 2306 may be referred to as "HEW-SIG-B".

The payload 2308 includes the data. For example, the payload 2308 may be comprised of the data signal in the OFDMA scheme.

The data signal transmitted through the payload 2308 may be generated and analyzed according to the indication of the frequency mapping information 2304 and the signal parameters 2306.

Although not illustrated in the FIG. 23, additional information for use in analyzing the user information 2302, the frequency mapping information 2304, or the signal parameters 2306, may also be included. For example, the additional information may include the MCS/CP (cyclic prefix) length/the number of symbols of at least one piece of the signal bandwidth, the radio node identifier, the user information 2302, the frequency mapping information 2304, or the signal parameter 2306. If the number of symbols is "0," the user information 2302, the frequency mapping information 2304, and the signal parameter 2306 may be omitted.

Figure 24:
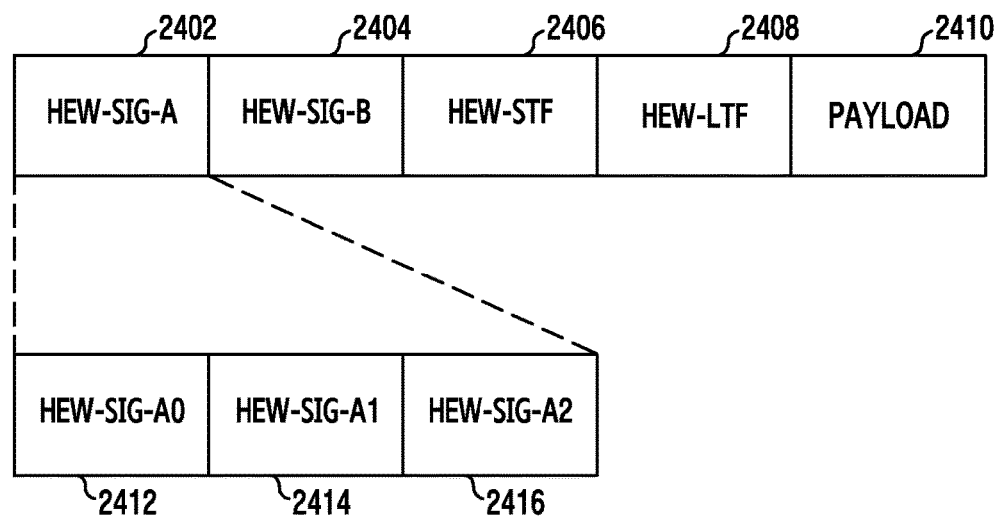
FIG. 24 illustrates a data unit including resource allocation information and data in a wireless communication system, according to an embodiment of the present disclosure.

FIG. 24 illustrates a data unit including resource allocation information and data in a wireless communication system, according to an embodiment of the present disclosure. For example, the configuration illustrated in FIG. 24 may be applied to the resource allocation information and the data illustrated in FIG. 23.

Specifically, FIG. 24 illustrates an example in which the resource allocation information and the data can be applied to the IEEE 802.11 standard.

Referring to FIG. 24, the data unit includes HEW-SIG-A 2402, HEW-SIG-B 2404, HEW-STF 2406, HEW-LTF 2408, and a payload 2410. In addition, the HEW-SIG-A 2402 includes HEW-SIG-A0 2412, HEW-SIG-A1 2414, and HEW-SIG-A2 2416. The HEW-SIG-A0 2412 corresponds to the additional information described with reference to FIG. 23, and may include the information to analyze the HEW-SIG-A1 2414, the HEW-SIG-A2 2416, and the HEW-SIG-B 2404. The HEW-SIG-A1 2414 corresponds to the user information 2302 of FIG. 23, and includes the information on the users. The HEW-SIG-A2 2416 corresponds to the frequency mapping information 2304 of FIG. 23, and includes the resource allocation information for the OFDMA scheme. The HEW-STF 2406 and HEW-LTF 2408 include at least one sequence for the frame detection, the synchronization, or the channel estimation. The HEW-SIG-B 2404 corresponds to the signal parameters 2306 of FIG. 23, and transfers the control information for the data signal analysis of the terminal. The payload 2410 contains the data.

FIG. 25 illustrates user information in a wireless communication system, according to an embodiment of the present disclosure. For example, the HEW-SIG-A1 2414 of FIG. 24 may include sub-fields as illustrated in FIG. 25.

Referring to FIG. 25, the user information, e.g., the HEW-SIG-A1 2414, includes AIDs of the users who are to receive the data, and indicators 2502. Each of the indicators 2502, which may have a size of 1 bit, indicates whether or not the user corresponding to the subsequent AID participates in the MU-MIMO transmission. For example, if the indicator 2502 has a first value (for example, 0), the corresponding user participates in the MU-MIMO transmission, and if the indicator 2502 has a second value (for example, 1), the user does not participate in the MU-MIMO transmission.

For example, if there are band indexes #0, #1, #2 and #3, and if up to four users are able to participate in the MU-MIMO transmission for each band, the users of AID#1 and AID#2 may use a single band, the user of AID#3 may use another band, the users of AID#4, AID#5, AID#6, and AID#7 may use still another band, and the user of AID#8 may use still yet another band. In this case, HEW-SIG-A1 2414 is configured as {AID#1, 0, AID#2, 1, AID#3, 1, AID#4, 0, AID#5, 0, AID#6, 0, AID#7, 1, AID#8}. That is, the indicators 2502 indicate whether or not the users who use the left and right AIDs use the same band.

Figure 26:
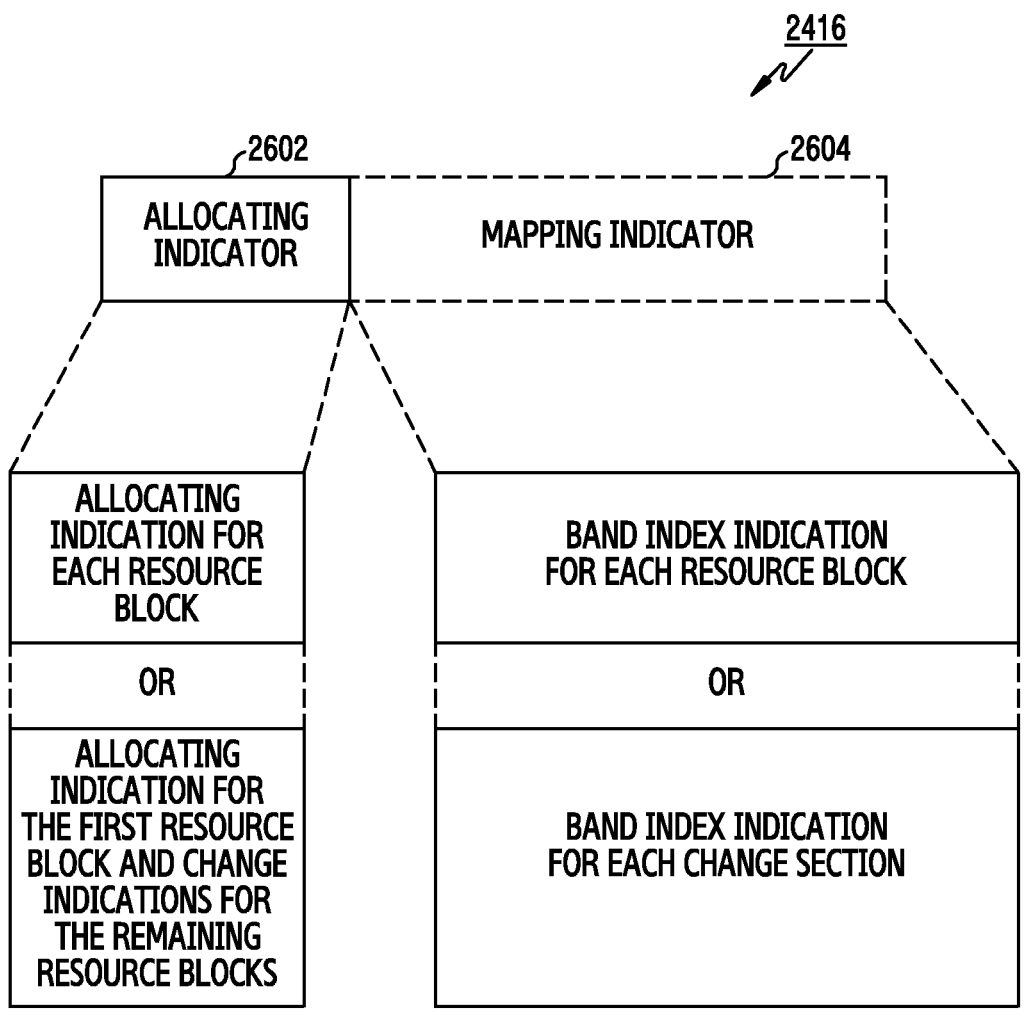
FIG. 26 illustrates frequency mapping information in a wireless communication system, according to an embodiment of the present disclosure.

FIG. 26 illustrates frequency mapping information in a wireless communication system, according to an embodiment of the present disclosure. For example, the HEW-SIG-A2 2416 of FIG. 24 may be configured as illustrated in FIG. 26.

Referring to FIG. 26, the frequency mapping information, e.g., the HEW-SIG-A2 2416, includes an allocating indicator 2602 and a mapping indicator 2604. The allocating indicator 2602 and the mapping indicator 2604 may be collectively referred to as "user channel configuration" information.

The allocating indicator 2602 indicates whether or not each frequency band is used, and the mapping indicator 2604 indicates which band index is mapped with the frequency band. The allocating indicator 2602 may include allocating indications for each resource block. For example, if there are nine resource blocks, and if all of the resource blocks are used, the allocating indicator 2602 may be configured to be "111111111."

As another example, if all of the resource blocks except for the third resource block and the seventh resource block among nine resource blocks are used, the allocating indicator 2602 may be configured to be "110111011."

Additionally, the allocating indicator 2602 may include the allocating indication for the first resource block, and the change indications for the remaining resource blocks. The change indication indicates whether or not a mapped band index or user is changed compared with a previous resource block.

For example, if there are nine resource blocks, and if the first to the fourth resource blocks are mapped with the band index #0, and the fifth to the ninth resource blocks are mapped with the band index #1, the allocating indicator 2602 may be configured to be "100010000." Here, the first bit "1" indicates that the first resource block is allocated, and the fifth bit "1" indicates that the band index that is mapped with the fifth resource block or subsequent resource blocks is changed.

Alternatively, if there are nine resource blocks, and if the first and the second resource blocks are mapped with the band index #0; the fourth resource block is mapped with the band index #1; the fifth and the sixth resource blocks are mapped with the band index #1; and the eighth and the ninth resource blocks are mapped with the band index #2, the allocating indicator 2602 may be configured to be "101110110." Here, the first bit "1" indicates that the first resource block is allocated, and the other "1s" indicates the band index that is mapped at the corresponding position is changed, or the resource block of the corresponding position is not used.

The mapping indicator 2604 may include band index indications for each resource block. That is, the mapping indicator 2604 may include as many band index indications as the number of resource blocks that are used.

For example, if there are nine resource blocks, and if the first to the fourth resource blocks are mapped with the band index #0, and the fifth to the ninth resource blocks are mapped with the band index #1, the mapping indicator 2604 may be configured to be "000011111." In this case, one bit indicates a single band index.

Alternatively, if there are nine resource blocks, and if the first and the second resource blocks are mapped with the band index #0; the fourth resource block is mapped with the band index #1; the fifth and the sixth resource blocks are mapped with the band index #3; and the eighth and the ninth source blocks are mapped with the band index #2, the mapping indicator 2604 may be configured to be "00000111111010." In this case, two bits indicate a single band index.

Additionally, the mapping indicator 2604 may include change indications for each change section. The change section refers to the section that is occupied by the consecutive resource blocks that are mapped with the same band index when the allocating indicator 2602 includes the change indications. That is, the mapping indicator 2604 may include as many band index indications as the number of change sections.

For example, if there are nine resource blocks, and if the first to the fourth resource blocks are mapped with the band index #0, and the fifth to the ninth resource blocks are mapped with the band index #1, i.e., if the mapped band index is changed at the fifth resource block, the mapping indicator 2604 may be configured to be "01." In this case, one bit indicates a single band index.

Alternatively, if there are nine resource blocks, and if the first and the second resource blocks are mapped with the band index #0; the fourth resource block is mapped with the band index #1; the fifth and the sixth resource blocks are mapped with the band index #3; and the eighth and the ninth resource blocks are mapped with the band index #2, i.e., if the mapped band indexes are changed at the fourth, the fifth, and the eighth resource blocks and the third and the seventh resource blocks are not used, the mapping indicator 2604 may be configured to be "000001111110." In this case, two bits indicate a single band index.

In addition, the second band index indication (the third and the fourth bits) "00" and the fifth band index indication (the ninth and the tenth bits) "11" are configured to be the same value as the previous band index indication in order to indicate that the corresponding resource blocks are not used.

Alternatively, the mapping indicator 2604 may be omitted. In this case, the frequency bands may be mapped according to the sequence of the AIDs included in the HEW-SIG-A1 2414. In order to indicate the resource blocks that are not used, the AID that indicates "no allocation" may be included in the HEW-SIG-A1 2414.

Although not illustrated in the FIG. 26, the allocating indicator 2602 and the mapping indicator 2604 may include the indication/change information for each resource block group, instead of the indication/change information for each resource block. For example, the resource block group may be defined in the minimum unit of B MHz, and 'B' may be multiples of 20 (e.g., 20, 40, etc.).

Figure 27:
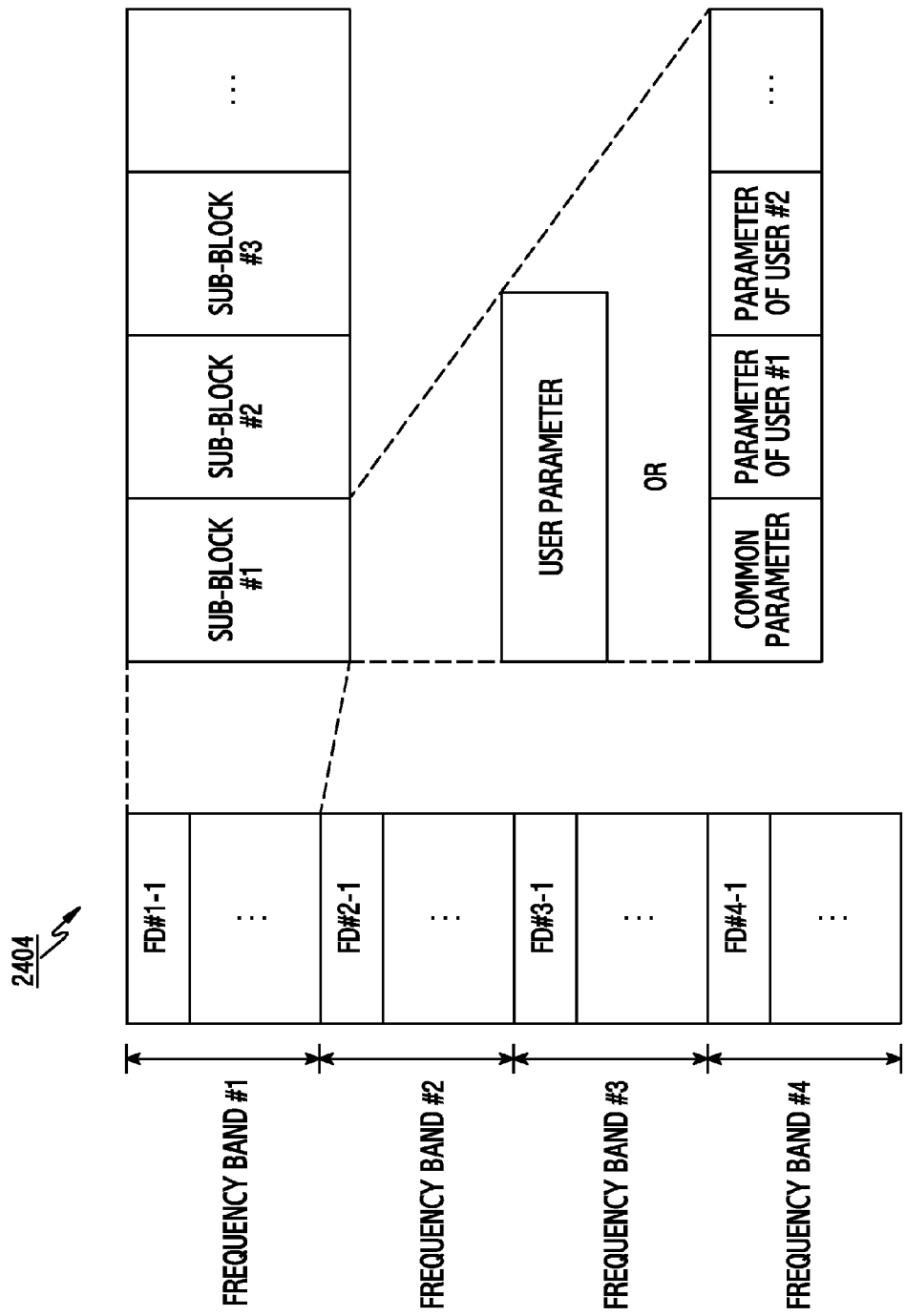
FIG. 27 illustrates parameters in a wireless communication system, according to an embodiment of the present disclosure.

FIG. 27 illustrates a signal parameter in a wireless communication system, according to an embodiment of the present disclosure. For example, the HEW-SIG-B 2404 of FIG. 24 may be configured using the signal parameter as illustrated in FIG. 27.

Referring to FIG. 27, the HEW-SIG-B 2404 is a field by which specific information is sent to each user. In order to receive the data in the OFDMA scheme, one or more pieces of user information are configured for each division unit (e.g., 20 MHz, 40 MHz, etc.) of the frequency band. Each frequency band includes one or more frequency divisions. The maximum number of sub-blocks that may be included corresponds to the number of frequency divisions that are included in each frequency band, and each sub-block may include a parameter group for a single user or a parameter group for a plurality of users.

The sub-block corresponding to the frequency division, to which the MU-MIMO scheme is not applied, includes the parameter group for a single user. The sub-block corresponding to the frequency division, to which the MU-MIMO scheme is applied, includes the parameter group for a plurality of users.

The parameter group for a plurality of users may include a common parameter group and a per-user parameter group. For example, the common parameter group may include the application of beamforming, or the application of the STBC, and the per-user parameter group may include the number of space-time streams, the coding scheme, or the MCS.

In accordance with the above-described embodiments of the present disclosure, in a wireless communication system, an MU-MIMO scheme and an OFDMA are supported so that the maximum number of supportable terminals increases, and the extension for supporting more terminals can be easily obtained.

In the detailed embodiments of the present disclosure described above, elements that are included in the disclosure are expressed as singular nouns or plural nouns according to the detailed embodiments provided therein. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for operating a terminal in a wireless communication system, the method comprising:
receiving identification information of a band designated for the terminal and information indicating a group to which the terminal belongs according to a non-orthogonal frequency division multiple access (OFDMA) scheme;
receiving data signals generated based on resource allocation information on the band, according to an OFDMA scheme; and
demodulating and decoding the data signals based on the resource allocation information.

2. The method of claim 1, wherein the identification information of the band includes an index that distinguishes the band from other bands that are used in the group to which the terminal belongs.

3. The method of claim 1, wherein the resource allocation information includes information indicating a frequency band that is mapped with the identification information, and information for the demodulating and decoding of the data.

4. The method of claim 1, wherein the resource allocation information includes information indicating whether or not each of a plurality of frequency bands is used, and information on mappings between the plurality of frequency bands and band indexes.

5. The method of claim 1, wherein the resource allocation information includes control information for a plurality of frequency bands, and
wherein each of the plurality of frequency bands is separated from each other according to multiples of 20 MHz as a minimum unit.

6. The method of claim 1, wherein the resource allocation information includes per-band parameter groups corresponding to each of a plurality of frequency bands, and per-user parameter groups for each of terminals.

7. The method of claim 1, wherein the resource allocation information includes per-user parameter groups for each of a plurality of terminals.

8. The method of claim 1, wherein the resource allocation information and the data are included a single protocol data unit (PDU).

9. A method for operating a radio node in a wireless communication system, the method comprising:
transmitting identification information of a band designated for a terminal and information indicating a group to which the terminal belongs according to a non-orthogonal frequency division multiple access (OFDMA) scheme; and
transmitting data signals generated based on resource allocation information on the band, according to an OFDMA scheme.

10. The method of claim 9, wherein the identification information of the band includes an index that distinguishes the band from other bands that are used in the group to which the terminal belongs.

11. The method of claim 9, wherein the resource allocation information includes information indicating a frequency band that is mapped with the identification information, and information for the demodulating and decoding of the data.

12. The method of claim 9, wherein the resource allocation information includes information indicating whether or not each of a plurality of frequency bands is used, and information indicating mappings between the plurality of frequency bands and band indexes.

13. The method of claim 9, wherein the resource allocation information includes control information for a plurality of frequency bands, and
wherein each of the plurality of frequency bands is separated from each other according to multiples of 20 MHz as a minimum unit.

14. The method of claim 9, wherein the resource allocation information includes per-band parameter groups that correspond to each of a plurality of frequency bands, and per-user parameter groups for each of a plurality of terminals.

15. The method of claim 9, wherein the resource allocation information includes per-user parameter groups for each of a plurality of terminals.

16. The method of claim 9, wherein the resource allocation information and the data are included a single protocol data unit (PDU).

17. An apparatus for a terminal in a wireless communication system, the apparatus comprising:
a transceiver configured to:
receive identification information of a band designated for the terminal and information indicating a group to which the terminal belongs according to a non-orthogonal frequency division multiple access (OFDMA) scheme, and
receive data signals generated based on resource allocation information on the band, according to an OFDMA scheme; and
at least one processor configured to demodulate and decode the data signals based on the resource allocation information.

18. The apparatus of claim 17, wherein the identification information of the band includes an index that distinguishes the band from other bands that are used in the group to which the terminal device belongs.

19. The apparatus of claim 17, wherein the resource allocation information includes information indicating a frequency band that is mapped with the identification information, and information for demodulating and decoding the data.

20. The apparatus of claim 17, wherein the resource allocation information includes information indicating whether or not each of a plurality of frequency bands is used, and information on mappings between the plurality of frequency bands and band indexes.

21. The apparatus of claim 17, wherein the resource allocation information includes control information for a plurality of frequency bands, and
wherein each of the plurality of frequency bands is separated from each other according to multiples of 20 MHz as a minimum unit.

22. The apparatus of claim 17, wherein the resource allocation information includes per-band parameter groups that correspond to each of a plurality of frequency bands, and per-user parameter groups for each of a plurality of terminal devices.

23. The apparatus of claim 17, wherein the resource allocation information includes per-user parameter groups for each of a plurality of terminal devices.

24. The apparatus of claim 17, wherein the resource allocation information and the data are included a single protocol data unit (PDU).

25. An apparatus for a radio node in a wireless communication system, the apparatus comprising:
a transceiver; and
at least one processor configured to:
transmit, via the transceiver, identification information of a band designated for a terminal and information indicating a group to which the terminal belongs according to a non-orthogonal frequency division multiple access (OFDMA) scheme, and
transmit, via the transceiver, data signals generated based on resource allocation information on the band, according to an OFDMA scheme.

26. The apparatus of claim 25, wherein the identification information of the band includes an index that distinguishes the band from other bands that are used in the group to which the terminal belongs.

27. The apparatus of claim 25, wherein the resource allocation information includes information indicating a frequency band that is mapped with the identification information, and information for demodulating and decoding the data.

28. The apparatus of claim 25, wherein the resource allocation information includes information indicating whether or not each of a plurality of frequency bands is used, and information on mappings between the plurality of frequency bands and band indexes.

29. The apparatus of claim 25, wherein the resource allocation information includes control information for a plurality of frequency bands, and
wherein each of the plurality of frequency bands is separated from each other according to multiples of 20 MHz as a minimum unit.

30. The apparatus of claim 25, wherein the resource allocation information includes per-band parameter groups that correspond to each of a plurality of frequency bands, and per-user parameter groups for each of a plurality of terminals.

31. The apparatus of claim 25, wherein the resource allocation information includes per-user parameter groups for each of a plurality of terminals.

32. The apparatus of claim 25, wherein the resource allocation information and the data are included a single protocol data unit (PDU).

* * * * *